(12) United States Patent
Wedderburn et al.

(10) Patent No.: US 11,326,518 B2
(45) Date of Patent: May 10, 2022

(54) COOLED COMPONENT FOR A GAS TURBINE ENGINE

(71) Applicant: United Technologies Corporation, Farmington, CT (US)

(72) Inventors: Maleek E. Wedderburn, Brimfield, MA (US); Nurhak Erbas-Sen, Glastonbury, CT (US); John W. Mubeezi, Vernon, CT (US); Fumitaka Ichihashi, West Hartford, CT (US); Roger O. Coffey, Glastonbury, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 79 days.

(21) Appl. No.: 16/751,494

(22) Filed: Jan. 24, 2020

(65) Prior Publication Data

US 2020/0256250 A1    Aug. 13, 2020

Related U.S. Application Data

(60) Provisional application No. 62/802,451, filed on Feb. 7, 2019.

(51) Int. Cl.
*F02C 7/12* (2006.01)
*F01D 9/02* (2006.01)

(52) U.S. Cl.
CPC .............. *F02C 7/12* (2013.01); *F01D 9/023* (2013.01); *F05D 2220/32* (2013.01); *F05D 2260/20* (2013.01)

(58) Field of Classification Search
CPC ............ F23R 3/002; F23R 2900/03041; F23R 2900/03042; F23R 2900/03044; F01D 5/186; F01D 5/187; F05D 2260/202
See application file for complete search history.

(56) References Cited

U.S. PATENT DOCUMENTS

| | | | | |
|---|---|---|---|---|
| 4,380,905 A | * | 4/1983 | Smart | F23R 3/04 60/756 |
| 5,253,471 A | * | 10/1993 | Richardson | F23R 3/10 60/804 |
| 6,029,455 A | * | 2/2000 | Sandelis | F23R 3/002 60/752 |
| 6,190,129 B1 | * | 2/2001 | Mayer | F01D 5/187 416/235 |
| 6,261,053 B1 | * | 7/2001 | Anderson | F01D 11/04 415/115 |

(Continued)

*Primary Examiner* — Todd E Manahan
*Assistant Examiner* — Thuyhang N Nguyen
(74) *Attorney, Agent, or Firm* — Carlson, Gaskey & Olds, P.C.

(57) ABSTRACT

A combustor panel arrangement for a gas turbine engine. The combustor panel arrangement includes a first combustor panel that has a first edge. A second combustor panel has a second edge facing the first edge. A first plurality of effusion holes extend through the first edge towards the second edge along a corresponding one of a first plurality of flow paths. A second plurality of effusion holes extend through the second edge along a corresponding one of a second plurality flow paths towards the first edge. The first plurality of flow paths and the second plurality of flow paths are non-intersecting.

20 Claims, 10 Drawing Sheets

(56) References Cited

U.S. PATENT DOCUMENTS

| | | | |
|---|---|---|---|
| 6,470,685 B2* | 10/2002 | Pidcock | F23R 3/002 60/752 |
| 7,665,306 B2 | 2/2010 | Bronson et al. | |
| 9,625,152 B2 | 4/2017 | Papple et al. | |
| 10,753,207 B2* | 8/2020 | Rathay | F01D 5/20 |
| 2003/0213250 A1* | 11/2003 | Pacheco-Tougas | F23R 3/002 60/752 |
| 2008/0131261 A1* | 6/2008 | Lee | F01D 9/04 415/115 |
| 2015/0013340 A1* | 1/2015 | Pinnick | F23R 3/06 60/754 |
| 2016/0054001 A1* | 2/2016 | Bangerter | F23R 3/045 60/772 |
| 2016/0123593 A1 | 5/2016 | Baumgartner et al. | |
| 2017/0205069 A1 | 7/2017 | Tentorio et al. | |

* cited by examiner

COOLED COMPONENT FOR A GAS TURBINE ENGINE

CROSS-REFERENCE TO RELATED APPLICATIONS

This application claims priority to U.S. Provisional Application No. 62/802,451, which was filed on Feb. 7, 2019 and is incorporated herein by reference.

BACKGROUND

The present disclosure relates to components for a gas turbine engine, and more particularly to a cooling arrangement therefor.

A gas turbine engine typically includes a fan section, a compressor section, a combustor section, and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section.

Gas turbine combustors have evolved to annular shells with attached heat shield combustor liners at least partially forming the combustion chamber and comprising a panel and a shell. The panels may have reduced durability due to local hot spots that may cause high stress and cracking. Hot spots are conventionally combated with additional cooling air, however, this may have a potential negative effect on combustor emissions, pattern factor, and profile.

Hot spots may occur at junctions and lips of adjacent liners. Hot spots may occur at bulkhead panels and, field distress may propagate downstream towards the remaining liner panels. The distress may be accentuated in local regions where dedicated cooling is restricted due to space limitations. Hot spots may also appear on body panels downstream of the bulkhead panels, for example in regions downstream of diffusion quench holes. In general, although effective, a typical combustion chamber environment includes large temperature gradients at different planes distributed axially throughout the combustion chamber.

SUMMARY

In one exemplary embodiment, a combustor panel arrangement for a gas turbine engine. The combustor panel arrangement includes a first combustor panel that has a first edge. A second combustor panel has a second edge facing the first edge. A first plurality of effusion holes extend through the first edge towards the second edge along a corresponding one of a first plurality of flow paths. A second plurality of effusion holes extend through the second edge along a corresponding one of a second plurality flow paths towards the first edge. The first plurality of flow paths and the second plurality of flow paths are non-intersecting.

In a further embodiment of the above, the plurality of panels includes a plurality of bulkhead panels. The first panel includes a second edge that has a second plurality of effusion holes. The second panel includes a first edge that has a first plurality of effusion holes and the first edge is opposite the second edge.

In a further embodiment of any of the above, the first plurality of flow paths extend perpendicularly from the first edge. The second plurality of flow paths extend perpendicularly from the second edge.

In a further embodiment of any of the above, one of the first plurality of flow paths and the second plurality of flow paths are directed in a radially inward direction or a radially outward direction. The other of the first plurality of flow paths and second plurality of flow paths are directed in the other of the radially inward direction or the radially outward direction.

In a further embodiment of any of the above, a hot side surface faces in an axially downstream direction. An injector opening extends through at least one of the plurality of bulkhead panels.

In a further embodiment of any of the above, the plurality of panels includes at least one forward heat shield panel and at least one aft heat shield panel. The first edge and the second edge are circumferential edges.

In a further embodiment of any of the above, at least one forward heat shield panel is located axially forward of the at least one aft heat shield panel and at least partially circumferentially overlapping.

In a further embodiment of any of the above, the plurality of panels include a first heat shield panel that has an axially forward edge and a second heat shield panel that has an axially aft edge. A plurality of forward effusion holes extend through the axially forward edge along a plurality of forward flow paths. A plurality of aft effusion holes extend through the axially aft edge along a plurality of aft flow paths.

In a further embodiment of any of the above, the plurality of forward flow paths and the plurality of aft flow paths are non-intersecting.

In a further embodiment of any of the above, the plurality of forward flow paths extend perpendicularly to the axially forward edge and the plurality of aft flow paths extend perpendicularly to the axially aft edge.

In another exemplary embodiment, a combustor panel for a gas turbine engine that is complementary to an adjacent combustor panel and includes a first edge adapted to face a second edge of the adjacent combustor panel. A first plurality of effusion holes extend through the first edge along a corresponding one of a first plurality of flow paths and is adapted to extend towards a second edge of the adjacent combustor panel having a second plurality of effusion holes that extend along a corresponding one of a second plurality of flow paths towards the first edge. The first plurality of flow paths do not coincide with the second plurality of flow paths.

In a further embodiment of any of the above, the plurality of combustor panels are bulkhead panels. At least one first panel includes a second plurality of effusion holes that extend through a second edge along a second plurality of flow paths. At least one second panel includes a first plurality of effusion holes that extend through a first edge along a first plurality of flow paths. The first edge is opposite the second edge.

In a further embodiment of any of the above, the first plurality of flow paths extend perpendicularly from the first edge. The second plurality of flow paths extend perpendicularly from the second edge.

In a further embodiment of any of the above, one of the first plurality of flow paths and the second plurality of flow paths are directed in a radially inward direction or a radially outward direction. The other of the first plurality of flow paths and second plurality of flow paths are directed in the other of the radially inward direction or the radially outward direction.

In a further embodiment of any of the above, the plurality of combustor panels includes at least one forward heat shield panel and at least one aft heat shield panel. At least one forward heat shield panel is located axially forward of at least one aft heat shield panel and at least partially circumferentially overlapping.

In a further embodiment of any of the above, the first edge is an axially forward edge and the second edge is an axially aft edge.

In another exemplary embodiment, an assembly for a gas turbine engine that includes a first component that has a first edge. A second component has a second edge facing the first edge. A first plurality of effusion holes extend through the first edge towards the second edge along a corresponding one of a first plurality of flow paths. A second plurality of effusion holes extend through the second edge along a corresponding one of a second plurality flow paths towards the first edge. The first plurality of flow paths and the second plurality of flow paths are non-intersecting.

In a further embodiment of any of the above, the first component is a first blade outer air seal and the second component is a second blade outer air seal.

In a further embodiment of any of the above, the first component is a first airfoil and the second component is a second airfoil.

In a further embodiment of any of the above, the first component is a first combustor liner and the second component is a second combustor liner.

DETAILED DESCRIPTION

Figure 1:
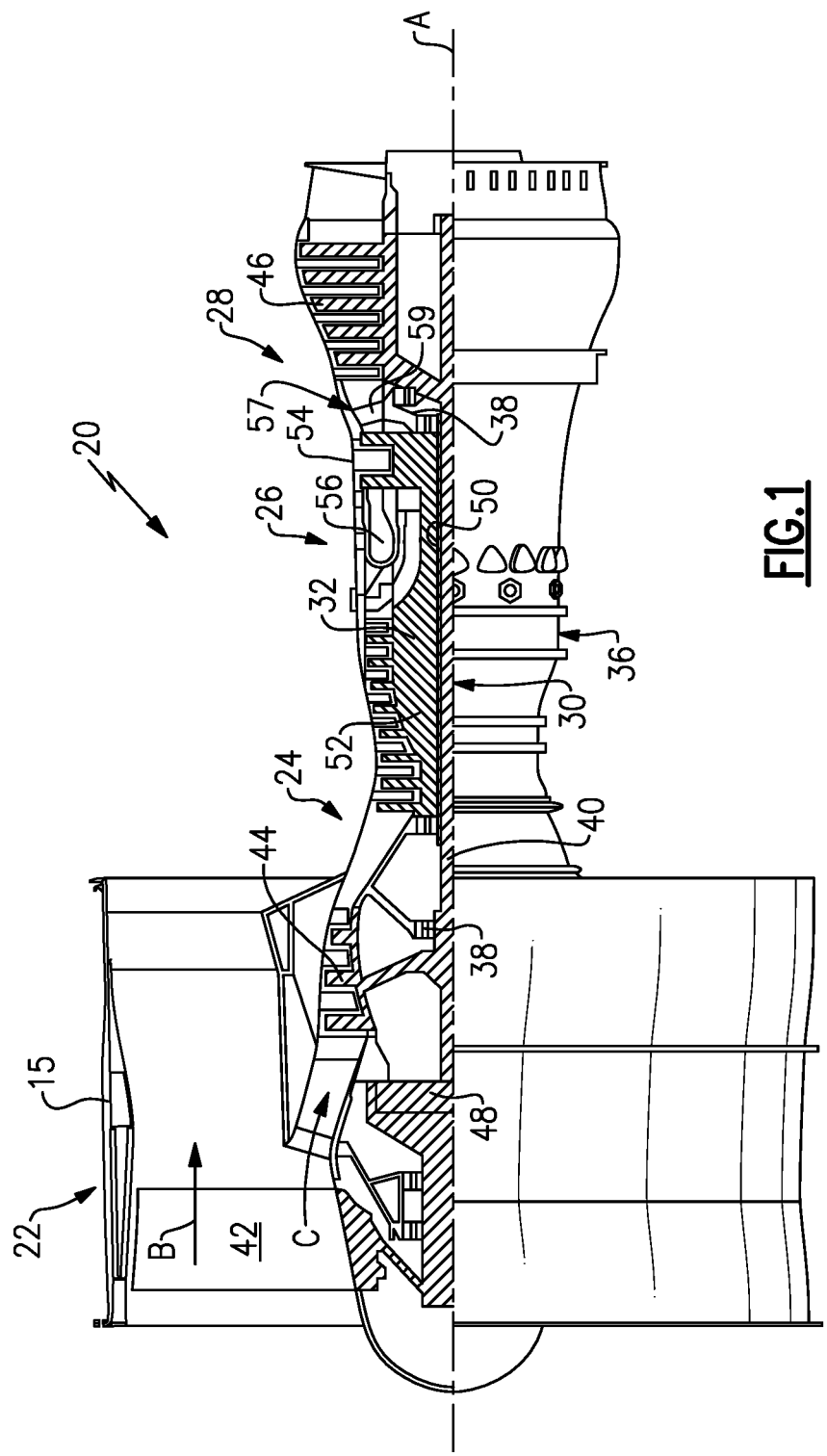
FIG. 1 is a schematic view of an example gas turbine engine according to a first non-limiting example.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram }° \text{R})/(518.7° \text{R})]^{0.5}$. The "Low corrected fan tip speed" as disclosed herein according to one non-limiting embodiment is less than about 1150 ft/second (350.5 meters/second).

Figure 2:
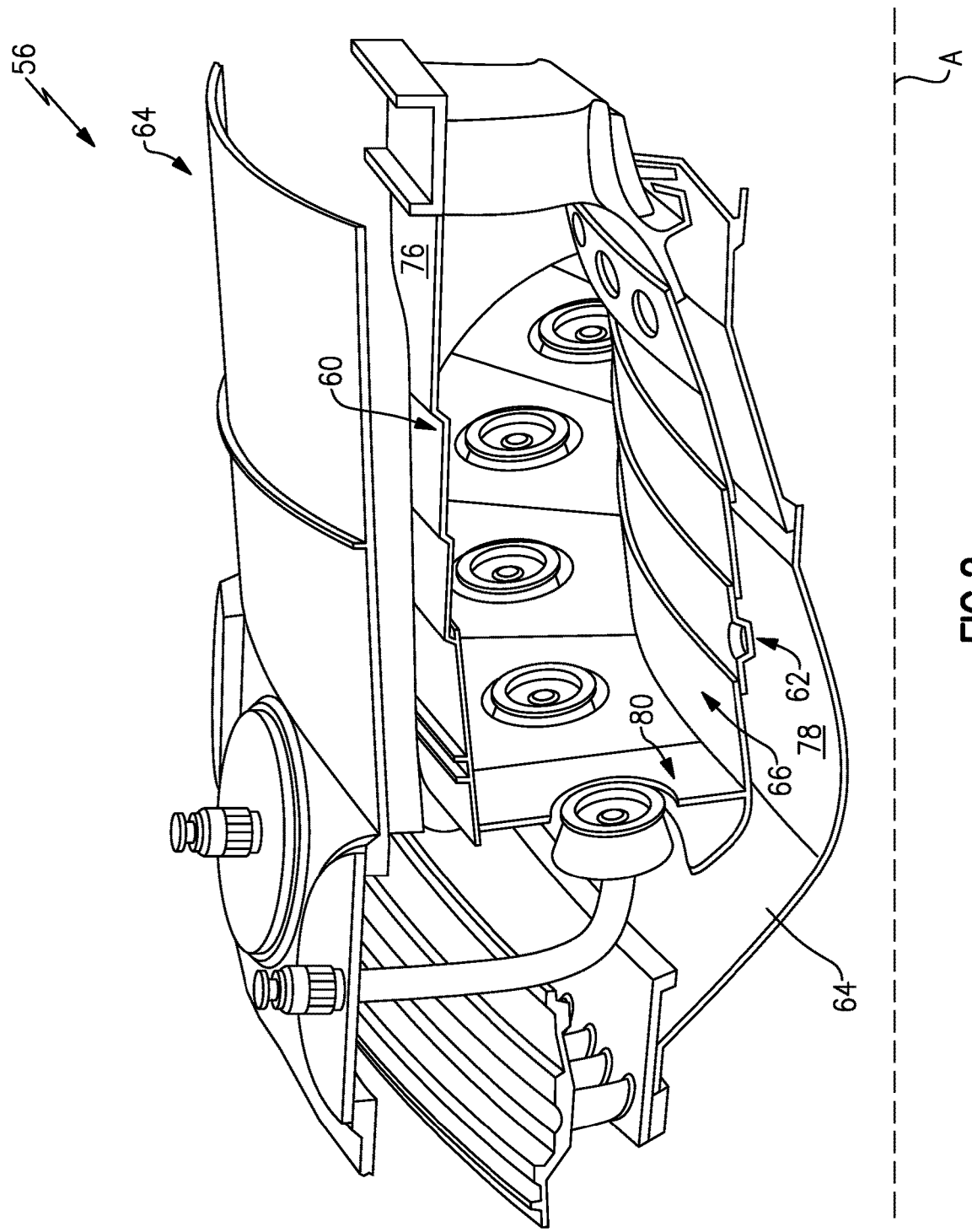
FIG. 2 is a perspective partial sectional view of an exemplary annular combustor that may be used with the gas turbine engine shown in FIG. 1.

FIG. 2 illustrates the combustor 56 having an array of combustor liners. The combustor 56 could include an outer combustor liner assembly 60, an inner combustor liner assembly 62 and a bulkhead liner assembly 80. The combustor liners are located within a combustor case 64 and at least partially define a combustion chamber 66. The combustion chamber 66 may be generally annular in shape and extend around the engine axis A.

The outer combustor liner assembly 60 and the combustor case 64 define an outer annular passageway 76 and the inner combustor liner assembly 62 and the combustor case 64 define an inner annular passageway 78. It should be understood that although a particular combustor 56 is illustrated, other combustor types with various combustor liner arrangements will also benefit from this disclosure. It should be further understood that the cooling flow paths are but an illustrated example and should not be limited only thereto.

Figure 3:
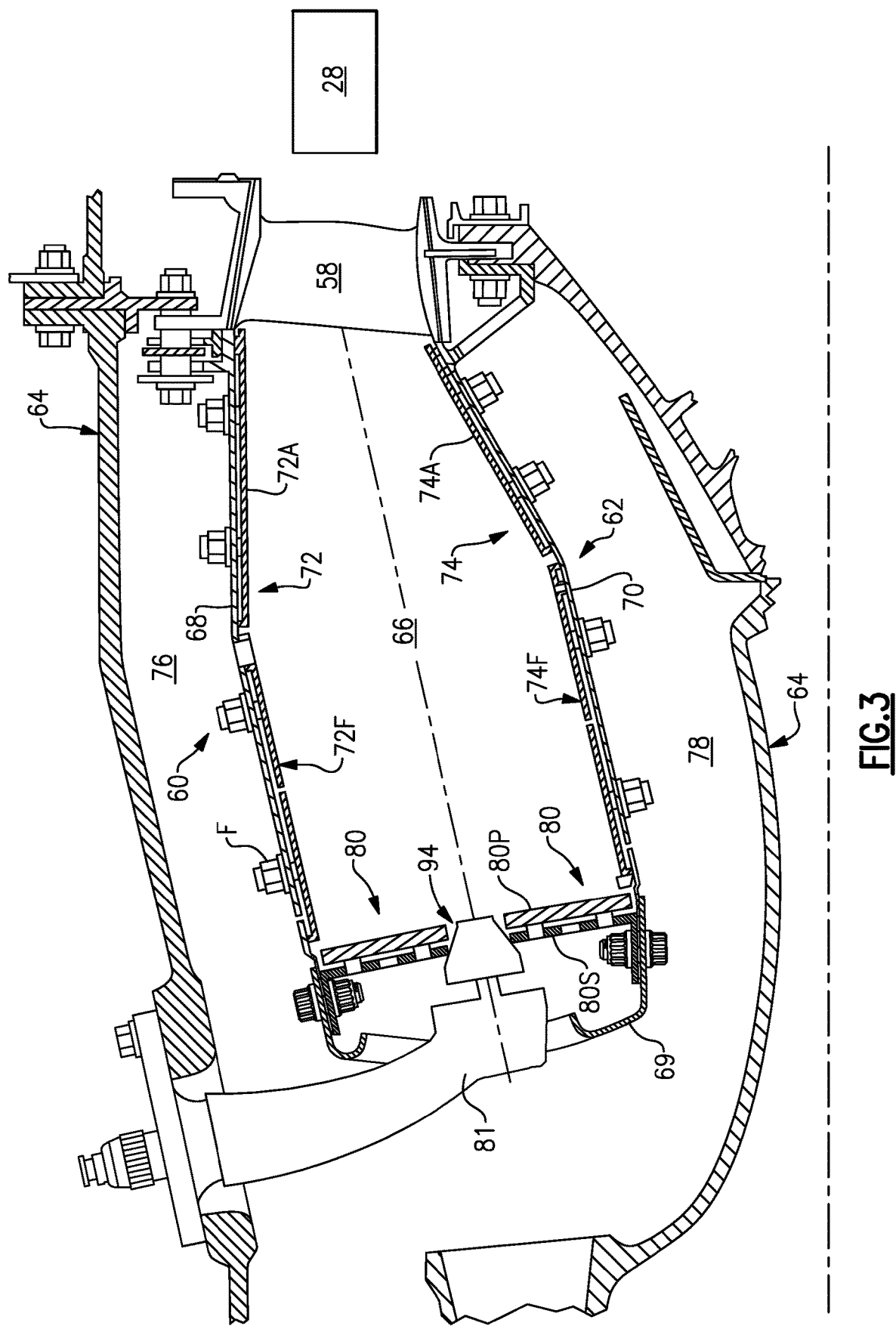
FIG. 3 is a cross-sectional view of an exemplary combustor that may be used with the gas turbine engine in FIG. 1.

With reference to FIG. 3, the combustor liner assemblies 60, 62, 80 contain and direct the combustion products to the turbine section 28 past airfoils 58. Each combustor liner of the combustor liner assemblies 60, 62, 80 generally includes a support shell 68, 70, 80S which supports one or more respective heat shield panels 72, 74, 80P attached to a hot side of the respective support shell 68, 70, 80S.

In the disclosed non-limiting example, the outer combustor liner assembly 60 could include one or more forward heat shield liners 72F and one or more aft heat shield liners 72A that interface with the hot side of the outer support shell 68. The inner combustor liner assembly 62 could include one or more forward heat shield liners 74F and one or more aft heat shield liners 74A that interface with the hot side of the inner support shell 70. Fastener assemblies F, such as studs and nuts (not shown), may be used to connect each of the heat shield panels 72, 74 to the respective inner and outer support shells 68, 70. Each of the heat shield panels 72A, 72F, 74A, 74F may be generally rectilinear and manufactured of, for example, a nickel based super alloy or ceramic material and could optionally include a suitable thermal barrier or environmental barrier coating at least on the hot side on the panel. It should be understood that various numbers, types, and array arrangements of heat shield panels may alternatively or additionally be provided.

As mentioned above, the array of combustor liners may also include a heat shield bulkhead liner assembly 80 that is radially arranged and generally transverse to the combustor liner assemblies 60, 62. Each bulkhead panel 80P includes an injector opening 94 to receive the fuel injector 81 which is mounted within a dome 69 that connects the respective inner and outer support shells 68, 70.

Figure 6:
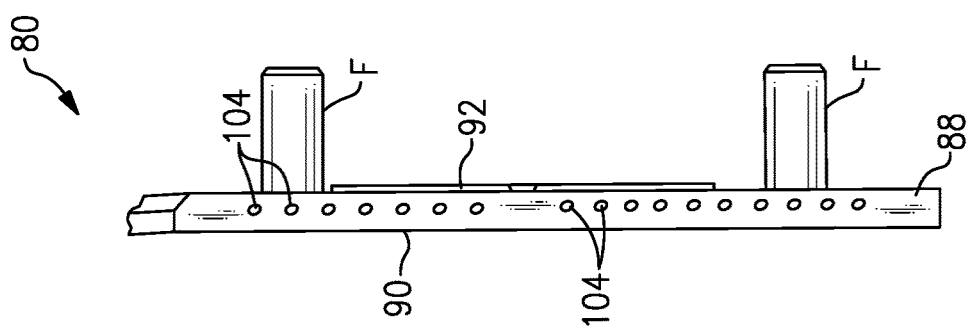
FIG. 6 is a second side view of the bulkhead panel of FIG. 4.
Figure 4:
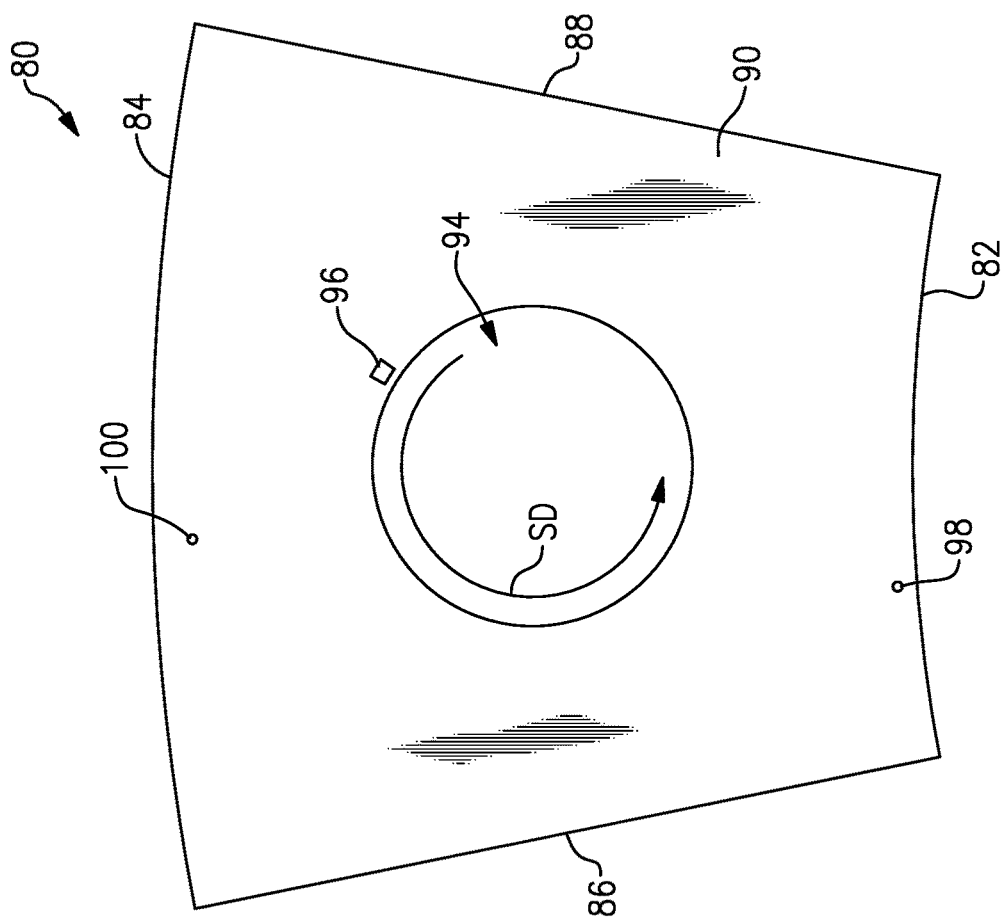
FIG. 4 is an axial upstream view of an example bulkhead panel.
Figure 5:
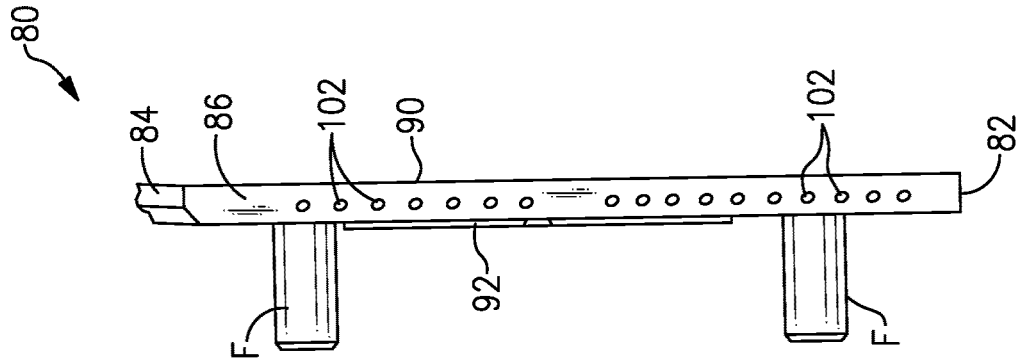
FIG. 5 is a first side view of the bulkhead panel of FIG. 4.
Figure 7:
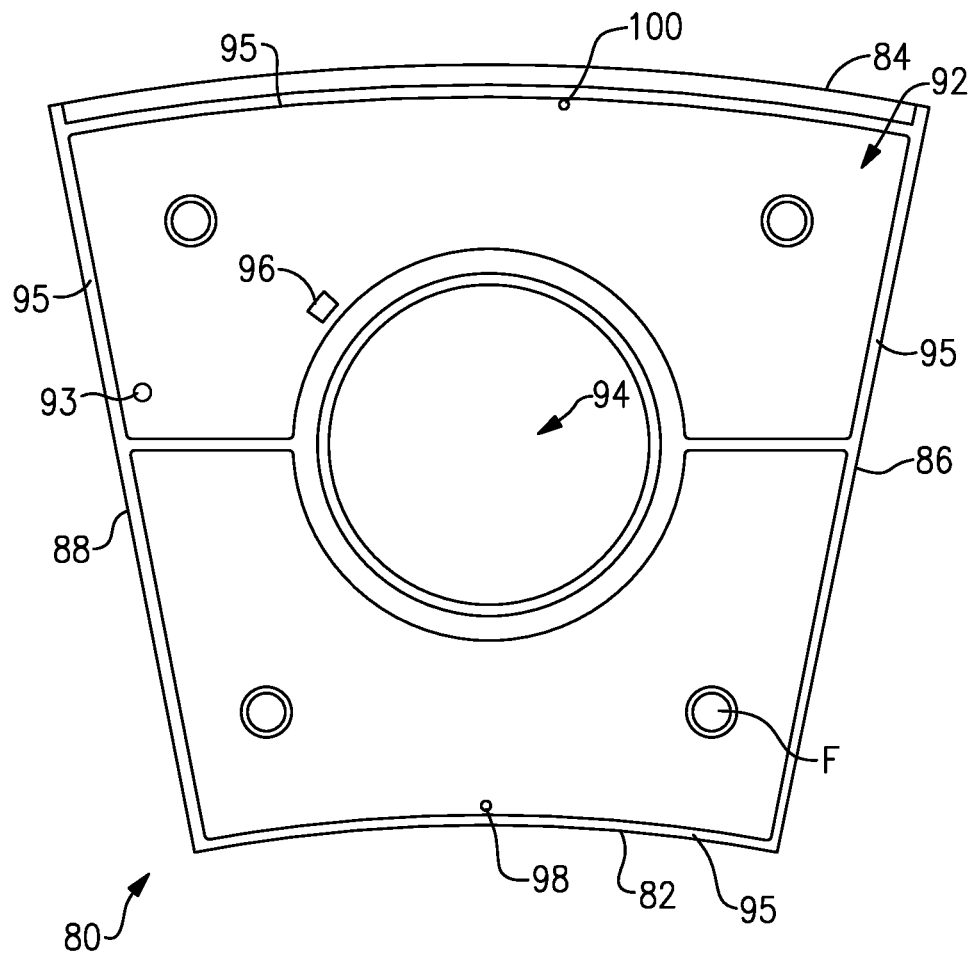
FIG. 7 is an axial downstream view of the bulkhead panel of FIG. 4.

FIGS. 4-7 illustrate the example bulkhead panel 80P. In the illustrated example, the bulkhead panel 80 includes an arcuate radially inner edge 82 and an arcuate radially outer edge 84 connected by a first circumferential edge 86 and a second circumferential edge 88. The bulkhead panel 80 includes a hot side 90 (FIGS. 4-6) and a cool side 92 (FIGS. 5-7). In the illustrated example, the hot side 90 faces an axially downstream direction (and the combustion chamber) and the cool side 92 faces an axially upstream direction. The cool side 92 of the bulkhead panel 80 also includes at least one pedestal 93 surrounded by a perimeter wall 95. In this disclosure, axial or axially and circumference or circumferentially are in relation to the engine axis A unless stated otherwise.

The injector opening 94 is located in a center of the bulkhead panel 80 and is surrounded by at least one injector cooling opening 96 that can be oriented to impart a swirl in swirl direction SD around the injector opening 94. At least one cooling passage 98 extends through the bulkhead panel 80 to cool the hot side 90 adjacent the radially inner edge 82 and at least one cooling passage 100 extends through the bulkhead panel 80 to cool the hot side 90 adjacent the radially outer edge 84. As shown in FIGS. 5 and 6, the first circumferential edge 86 includes a first plurality of effusion holes 102 and the second circumferential edge 88 includes a second plurality of effusion holes 104.

Figure 8:
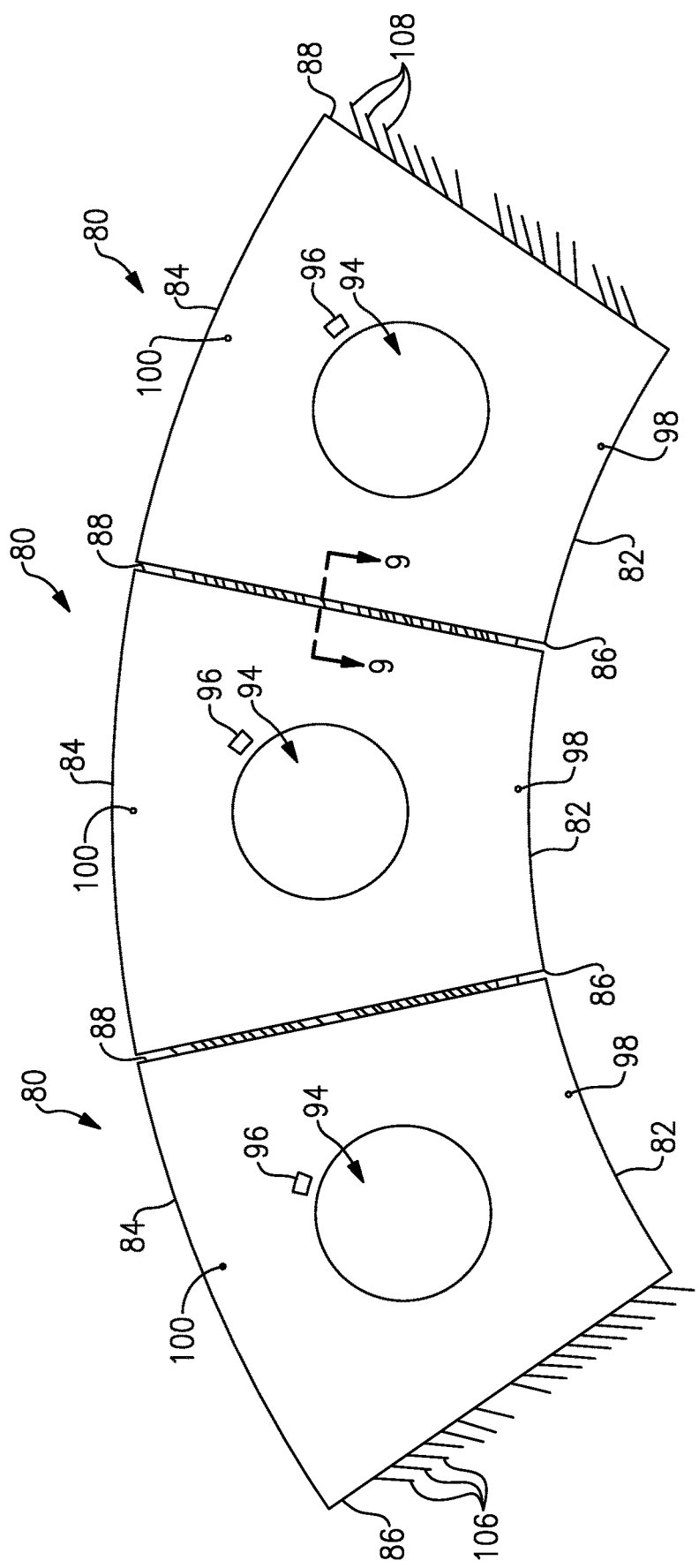
FIG. 8 is an axial upstream view of a plurality of bulkhead panels of FIG. 4.

As shown in FIGS. 5 and 6, the first and second plurality of effusion holes 102, 104 are positioned along first and second circumferential edges 86, 88, respectively, in a non-symmetric configuration to maximize cooling of an adjacent bulkhead panel 80 (see FIG. 8). As shown in FIG. 8, first flow paths 106 correspond to cooling air passing through a passage corresponding to one of the first plurality of effusion holes 102 and second flow paths 108 correspond to cooling air passing through a passage corresponding to one of the second plurality of effusion holes 104. In the illustrated example, the cooling air comes from a cooling source such as the compressor section 24.

In the illustrated example, the first plurality of effusion holes 102 extend in a direction having a circumferential component and a radially inward component and the second plurality of effusion holes 104 extending in a direction having a circumferential component and a radially outward component. Because the first and second flow paths 106, 108 extend in a non-perpendicular direction to the first and second circumferential edges 86, 88, respectively, the first and second flow paths 106, 108 have a larger contact area with the adjacent bulkhead panel 80. This is because the non-perpendicular flow paths form ellipses which have an area larger than a cross-sectional area of either of the first and second flow paths 106, 108.

Figure 9A:
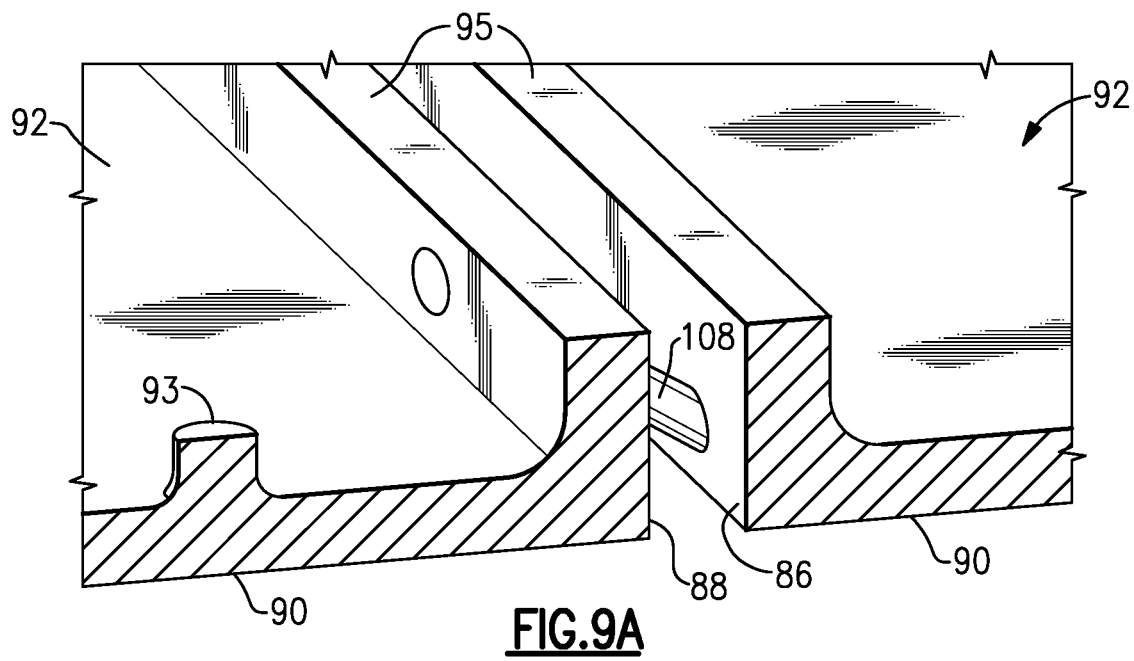
FIG. 9A is a perspective cross-sectional view along line 9-9 of FIG. 8.
Figure 9B:
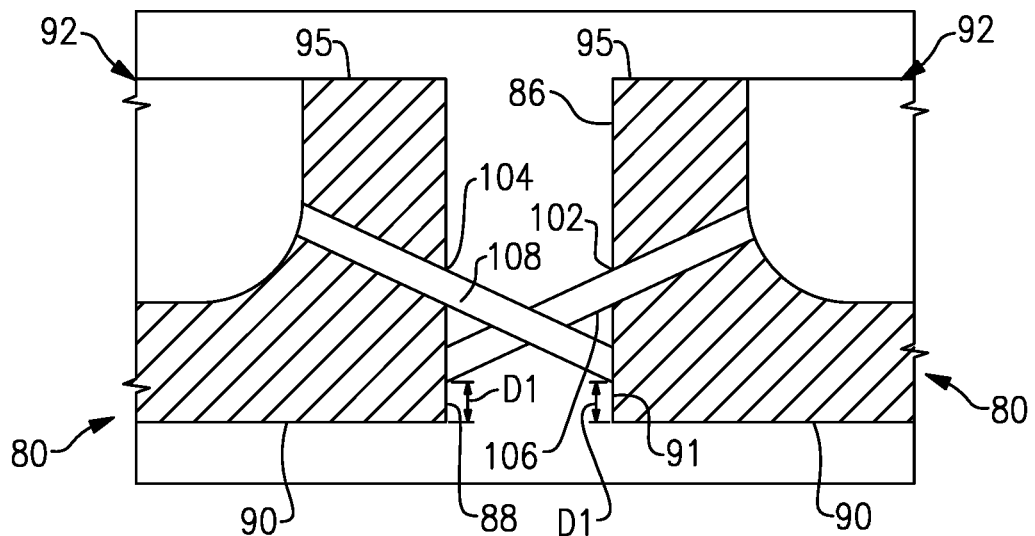
FIG. 9B is another view along line 9-9 of FIG. 8.
Figure 12:
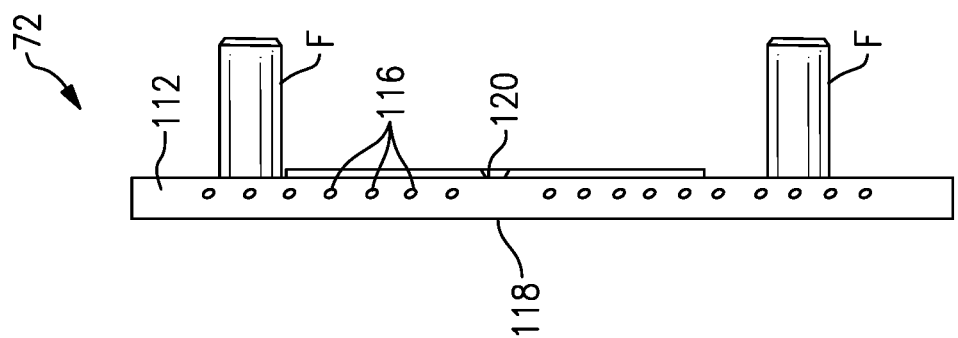
FIG. 12 is a second side view of the heat shield panel of FIG. 10.

The first and second flow paths 106, 108 are also directed at an adjacent bulkhead panel 80 inward from the hot side 90. This creates an impingement cooling effect on the adjacent bulkhead panel 80. In the illustrated example in FIGS. 9 and 10, the first and second flow paths 106, 108 extend through the first and second effusion holes 102, 104 and intersect the first and second circumferential edges 86, 88 on the adjacent bulkhead panel 80 at a distance D1 from the hot side 90. In the illustrated example, the distance D1 is about 0.015 inches (0.381 mm). In another example, the distance D1 is within 10% of 0.015 inches (0.381 mm). Also, the distance D1 may vary between the first and second flow paths 106, 108.

By having the first and second plurality of flow paths 106, 108 extend either upstream or downstream, the flow paths 106, 108 do not intersect each other. By not having the first and second flow paths 106, 108 intersect each other, cooling efficiency of the adjacent bulkhead panels is increased. Eliminating intersection of the first and second flow paths 106, 108 can be achieved by spacing the first and second plurality of effusion holes 102, 104 both axially and radially from each other or by spacing the first and second plurality of effusion holes 102, 104 from each other in only one of an axial or radial direction.

Alternatively, the first and second plurality of flow paths 106, 108 can extend perpendicular to the first and second circumferential edges 86, 88. When the first and second plurality of flow paths 106, 108 are perpendicular to the first and second circumferential edges 86, 88, the first and second plurality of effusion holes 102, 104 are positioned in a non-overlapping relationship in both the radial and the axial direction. This prevents cooling losses from flow paths intersecting each other.

Figure 10:
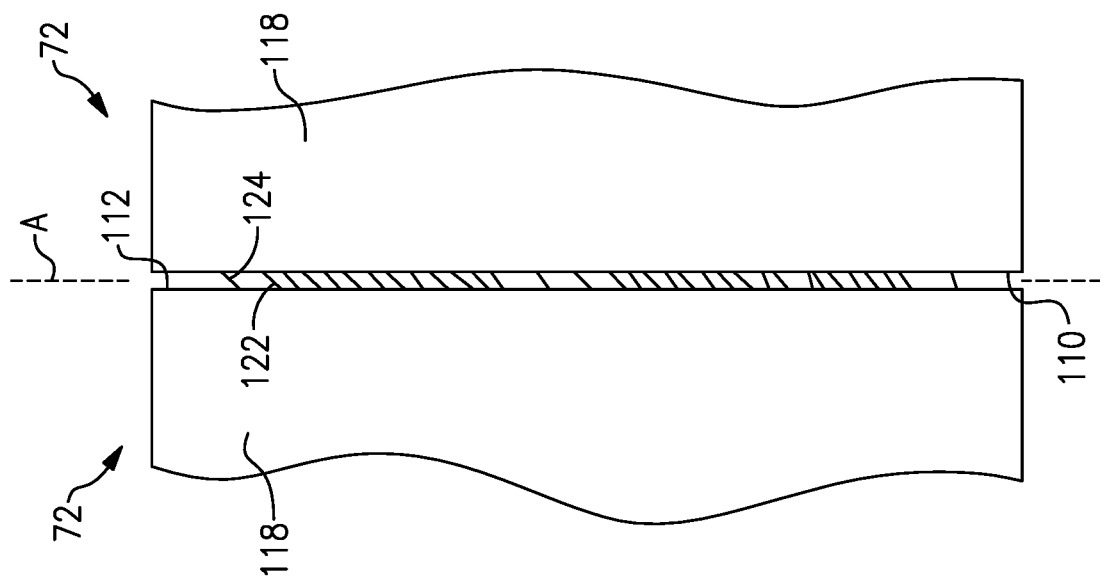
FIG. 10 is a radial view of an example heat shield panel.
Figure 11:
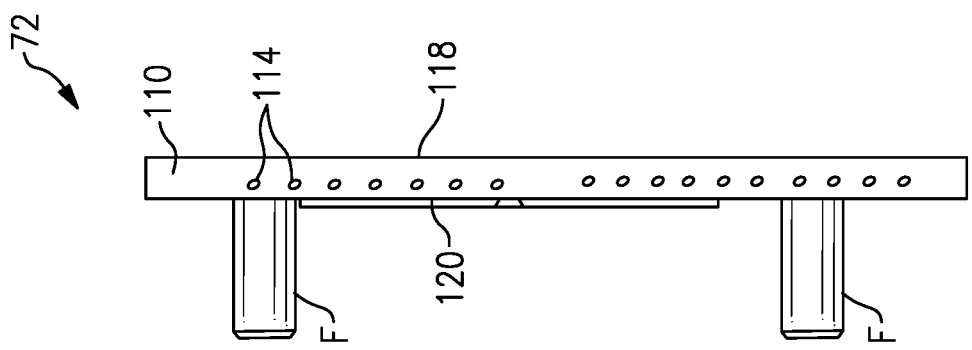
FIG. 11 is a first side view of the heat shield panel of FIG. 10.

FIGS. 10 and 11 illustrate opposing circumferential edges of the heat shield panels 72. However, the disclosure in relation to the heat shield panels 72 also applies to the heat shield panels 74. The heat shield panels 72 each include a first circumferential edge 110 with a first plurality of effusion holes 114 and a second circumferential edge 112 with a second plurality of effusion holes 116. The heat shield panel 72 also includes a hot side 118 and a cool side 120. A first plurality of flow paths 122 correspond to cooling air passing through the first plurality of effusion holes 114 along the first circumferential edge 110 and a second plurality of flow paths 124 correspond to cooling air passing through the second plurality of effusion holes 116 along the second circumferential edge 112.

In the illustrated non-limiting example, the first plurality of flow paths 122 extend in a direction having a circumferential component and an axial component and the second plurality of flow paths 124 extend in a direction having a circumferential component and an axial component. Because the first and second plurality of flow paths 122, 124 extend in a direction that is non-perpendicular to the first and second circumferential edges 110, 112, respectively, the first and second flow paths 122, 124 intersect adjacent heat shield panels 72 with a larger area as described above with respect to the bulkhead panels 80.

Figure 14:
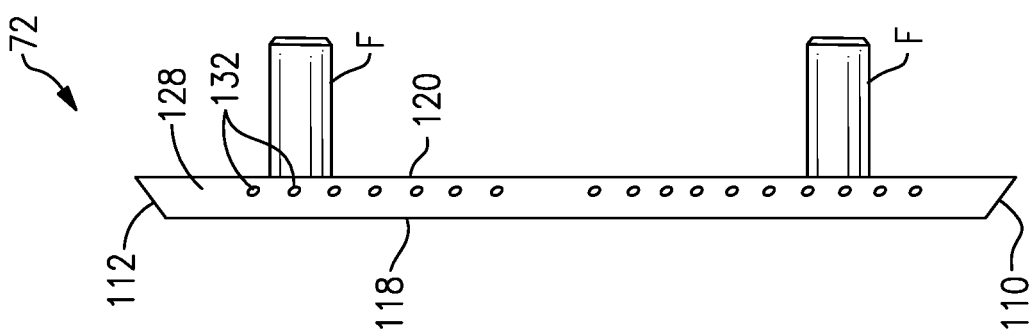
FIG. 14 is a first side view of the heat shield panel of FIG. 13.
Figure 15:
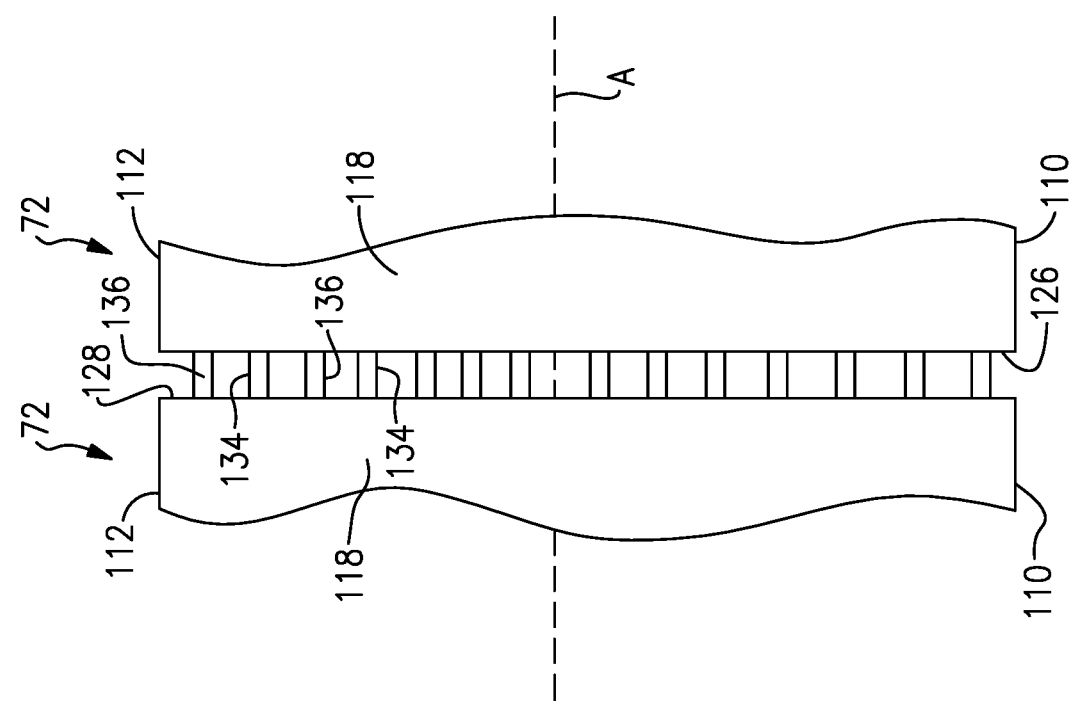
FIG. 15 is a second side view of the heat shield panel of FIG. 13.
Figure 13:
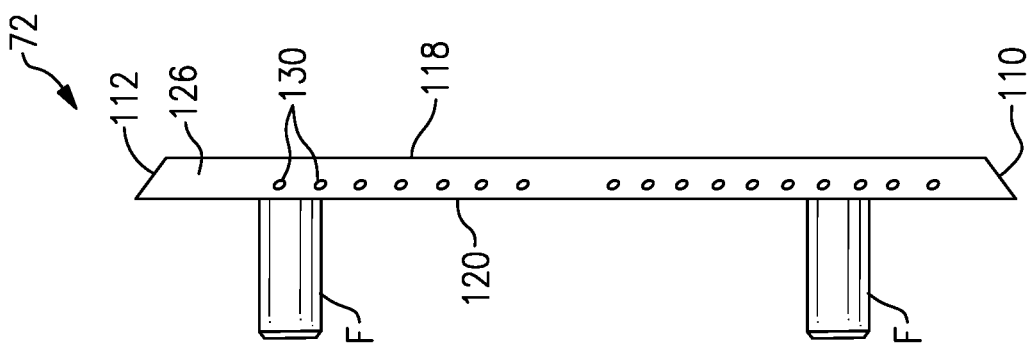
FIG. 13 is a radial view of an example heat shield panel.

FIGS. 13-15 illustrate opposing axial edges of the heat shield panels 72. The heat shield panels 72 each include a first axial edge 126 with a first plurality of effusion holes 130 and a second axial edge 128 with a second plurality of effusion holes 132. A first plurality of flow paths 134 correspond to cooling air passing through the first plurality of effusion holes 130 and a second plurality of flow paths 136 correspond to cooling air passing through the second plurality of effusion holes 132.

In the illustrated example, the first plurality of flow paths 134 extend in a first axial direction and the second plurality of flow paths 136 extend in a second axial direction opposite the first axial direction. The first and second flow paths 134 and 136 are arranged in a non-overlapping relationship to prevent the first and second plurality of flow paths 134, 136 from intersecting each other and decreasing the ability of cool the adjacent heat shield panels 72.

Figure 16:
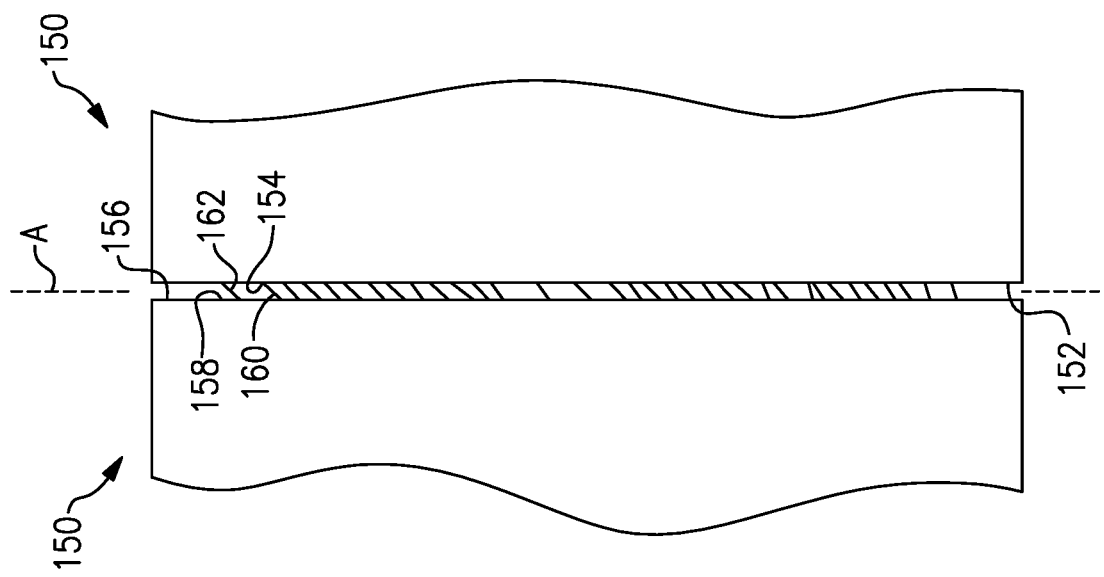
FIG. 16 illustrates a pair of adjacent blade outer air seals.

FIG. 16 illustrates opposing circumferential edges of blade outer air seals 150. The blade outer air seals 150 each include a first circumferential edge 152 with a first plurality of effusion holes 154 and a second axial edge 156 with a second plurality of effusion holes 158. A first plurality of flow paths 160 correspond to cooling air passing through the first plurality of effusion holes 154 and a second plurality of flow paths 162 correspond to cooling air passing through the second plurality of effusion holes 158. The first and second plurality of effusion holes 154, 158 and the first and second plurality of flow paths 160, 162 are similar to the first and second plurality of effusion holes 102, 104 and the first and second plurality of flow paths 106, 108, respectively, described above.

In the illustrated example, the first plurality of flow paths 160 extend in a first axial direction and the second plurality of flow paths 162 extend in a second axial direction opposite the first axial direction. The first and second flow paths 160, 162 are arranged in a non-overlapping relationship to prevent the first and second plurality of flow paths 160, 162 from intersecting each other and decreasing the ability to cool the adjacent blade outer air seal 150.

Figure 17:
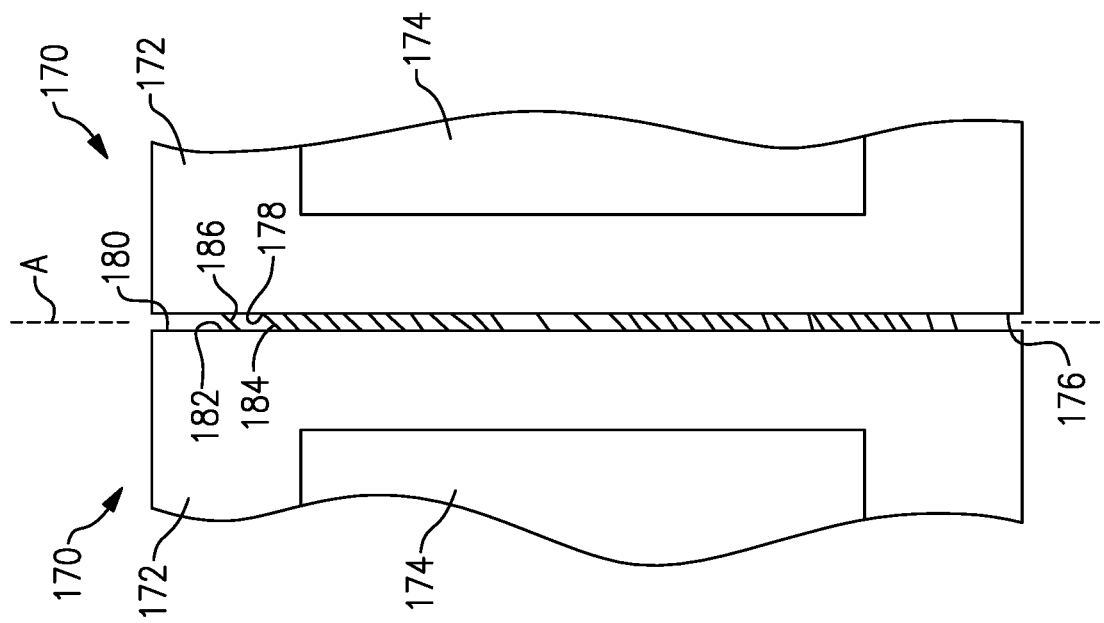
FIG. 17 illustrates a pair of adjacent blades.

FIG. 17 illustrates opposing circumferential edges of a blade 170, such as a turbine blade, having a platform 172, a root portion 174, and an airfoil (not shown). The blades 170 each include a first circumferential edge 176 with a first plurality of effusion holes 178 and a second axial edge 180 with a second plurality of effusion holes 182. A first plurality of flow paths 184 correspond to cooling air passing through the first plurality of effusion holes 178 and a second plurality of flow paths 186 correspond to cooling air passing through the second plurality of effusion holes 182. The first and second plurality of effusion holes 178, 182 and the first and second plurality of flow paths 184, 186 are similar to the first and second plurality of effusion holes 102, 104 and the first and second plurality of flow paths 106, 108, respectively, described above.

In the illustrated example, the first plurality of flow paths 184 extend in a first axial direction and the second plurality of flow paths 186 extend in a second axial direction opposite the first axial direction. The first and second flow paths 184, 186 are arranged in a non-overlapping relationship to prevent the first and second plurality of flow paths 184, 186 from intersecting each other and decreasing the ability to cool the adjacent blade 170.

Although the different non-limiting embodiments are illustrated as having specific components, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should also be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claim should be studied to determine the true scope and content of this disclosure.

What is claimed is:

1. A combustor panel arrangement for a gas turbine engine, the combustor panel arrangement comprising:
a first combustor panel having a first edge;
a second combustor panel having a second edge facing the first edge; and
wherein a first plurality of effusion holes include at least three immediately adjacent effusion holes with each extending through the first edge towards the second edge along a corresponding one of a first plurality of flow paths, a second plurality of effusion holes include at least three immediately adjacent effusion holes with each extending through the second edge along a corresponding one of a second plurality flow paths towards the first edge, and the first plurality of flow paths and the second plurality of flow paths are non-intersecting and flow in substantially opposite directions from each other, such that the first plurality of flow paths extend to intersect with a wall surface of the second edge and the second plurality of flow paths extend to intersect with a wall surface of the first edge.

2. The gas turbine engine of claim 1, wherein the first and second combustor panels are bulkhead panels and the first panel includes a second edge having a second plurality of effusion holes opposite the first edge of the first panel and the second panel includes a first edge having a first plurality of effusion holes opposite the second edge of the second panel.

3. The gas turbine engine of claim 2, wherein the first plurality of flow paths extend perpendicularly from the first edge and the second plurality of flow paths extend perpendicularly from the second edge.

4. The gas turbine engine of claim 2, wherein one of the first plurality of flow paths and the second plurality of flow paths are directed in a radially inward direction or a radially outward direction and the other of the first plurality of flow paths and second plurality of flow paths are directed in the other of the radially inward direction or the radially outward direction.

5. The gas turbine engine of claim 2, further comprising a hot side surface facing in an axially downstream direction and an injector opening extending through at least one of the bulkhead panels.

6. The gas turbine engine of claim 1, wherein the first combustor panel includes an axially forward heat shield panel and the second combustor panel includes an axially aft heat shield panel and the first edge and the second edge are circumferential edges.

7. The gas turbine engine of claim 6, wherein the forward heat shield panel is located axially forward of the aft heat shield panel and are at least partially circumferentially aligned.

8. The gas turbine engine of claim 6, wherein the forward heat shield panel includes an axially aft edge and the aft heat shield panel includes an axially forward edge, a plurality of forward effusion holes extend through the axially forward edge along a plurality of forward flow paths and a plurality of aft effusion holes extend through the axially aft edge along a plurality of aft flow paths.

9. The gas turbine engine of claim 8, wherein the plurality of forward flow paths and the plurality of aft flow paths are non-intersecting, the plurality of forward effusion holes includes at least three immediately adjacent effusion holes and the plurality of aft effusion holes includes at least three immediately adjacent effusion holes.

10. The gas turbine engine of claim 9, wherein the plurality of forward flow paths extend perpendicularly to the axially forward edge and the plurality of aft flow paths extend perpendicularly to the axially aft edge.

11. A combustor panel for a gas turbine engine, the combustor panel complementary to an adjacent combustor panel and comprising:
a first edge adapted to face a second edge of the adjacent combustor panel;
a first plurality of effusion holes extending through the first edge along a corresponding one of a first plurality of flow paths and adapted to extend towards a second edge of the adjacent combustor panel having a second plurality of effusion holes thereon that extend along a corresponding one of a second plurality of flow paths towards the first edge; and
wherein the first plurality of flow paths are non-intersecting with the second plurality of flow paths and flow in substantially opposite direction of the second plurality of flow paths when the first edge of the combustor panel is aligned with the second edge of the adjacent combustor panel, such that the first plurality of flow paths extend to intersect with a wall surface of the second edge and the second plurality of flow paths extend to intersect with a wall surface of the first edge.

12. The combustor of claim 11, wherein the combustor panel and the adjacent combustor panel are bulkhead panels and the combustor panel includes a second plurality of effusion holes extending through a second edge along a second plurality of flow paths and the adjacent combustor panel includes a first plurality of effusion holes extending through a first edge along a first plurality of flow paths and the first edge is opposite the second edge.

13. The combustor of claim 12, wherein the first plurality of flow paths extend perpendicularly from the first edge and the second plurality of flow paths extend perpendicularly from the second edge.

14. The combustor of claim 12, wherein one of the first plurality of flow paths and the second plurality of flow paths are directed in a radially inward direction or a radially outward direction and the other of the first plurality of flow paths and second plurality of flow paths are directed in the other of the radially inward direction or the radially outward direction.

15. The combustor of claim 11, wherein the combustor panel and the adjacent combustor panel include at least one forward heat shield panel and at least one aft heat shield panel the at least one forward heat shield panel is located axially forward of the at least one aft heat shield panel and at least partially circumferentially aligned.

16. The combustor of claim 15, wherein the first edge is an axially forward edge and the second edge is an axially aft edge.

17. An assembly for a gas turbine engine, the assembly comprising:
a first component having a first circumferential edge;
a second component having a second circumferential edge facing the first edge and adjacent the first edge; and
wherein a first plurality of effusion holes including at least three immediately adjacent effusion holes with each extending through the first edge towards the second edge along a corresponding one of a first plurality of flow paths, a second plurality of effusion holes at least three immediately adjacent effusion holes with each extending through the second edge along a corresponding one of a second plurality flow paths towards the first edge, and the first plurality of flow paths and the second plurality of flow paths are non-intersecting and flow in substantially opposite directions from each other, such that the first plurality of flow paths extend to intersect with a wall surface of the second edge and the second plurality of flow paths extend to intersect with a wall surface of the first edge.

18. The assembly of claim 17, wherein the first component is a first blade outer air seal and the second component is a second blade outer air seal.

19. The assembly of claim 17, wherein the first component is a first airfoil with a first platform having the first edge and the second component is a second airfoil with a second platform having the second edge.

20. The assembly of claim 17, wherein the first component is a first combustor liner and the second component is a second combustor liner.

* * * * *